United States Patent [19]

Hujsak et al.

[11] 4,195,804
[45] Apr. 1, 1980

[54] SPACE PLATFORM DOCKING DEVICE

[75] Inventors: Edward J. Hujsak, La Jolla; LeRoy E. Siden, San Diego, both of Calif.

[73] Assignee: General Dynamics Corporation, San Diego, Calif.

[21] Appl. No.: 891,884

[22] Filed: Mar. 30, 1978

[51] Int. Cl.² .............................................. B64G 9/00
[52] U.S. Cl. ................................................... 244/161
[58] Field of Search ........... 244/161, 158, 159, 135 R, 244/135 A; 114/249, 251, 253, 230

[56] References Cited

U.S. PATENT DOCUMENTS

| | | | |
|---|---|---|---|
| 2,199,588 | 5/1940 | Cobham et al. .................. 244/135 A |
| 2,761,636 | 9/1956 | Finlay .............................. 244/135 A |
| 3,201,065 | 8/1965 | Dunn ..................................... 244/161 |
| 3,389,877 | 6/1968 | Huber et al. .......................... 244/161 |
| 3,508,723 | 4/1970 | Warren et al. ........................ 244/161 |
| 3,737,117 | 6/1973 | Belew .................................... 244/161 |
| 3,753,536 | 8/1973 | White .................................... 244/161 |
| 4,083,520 | 4/1978 | Rupp et al. ........................... 244/161 |

Primary Examiner—Galen L. Barefoot
Attorney, Agent, or Firm—John R. Duncan

[57] ABSTRACT

A device for docking or joining large structures or vehicles in earth orbit under automatic and remote sensing and control. A thin flexible boom extending from one vehicle contacts the inner surface of a large open cone on the other as the two vehicles approach each other. The conical surface guides the boom end towards the apex where a reel for drawing in the boom engages the boom. As the boom is drawn in, and the vehicles come into close proximity, a mechanical latch is engaged for final rigidizing and securing.

7 Claims, 9 Drawing Figures

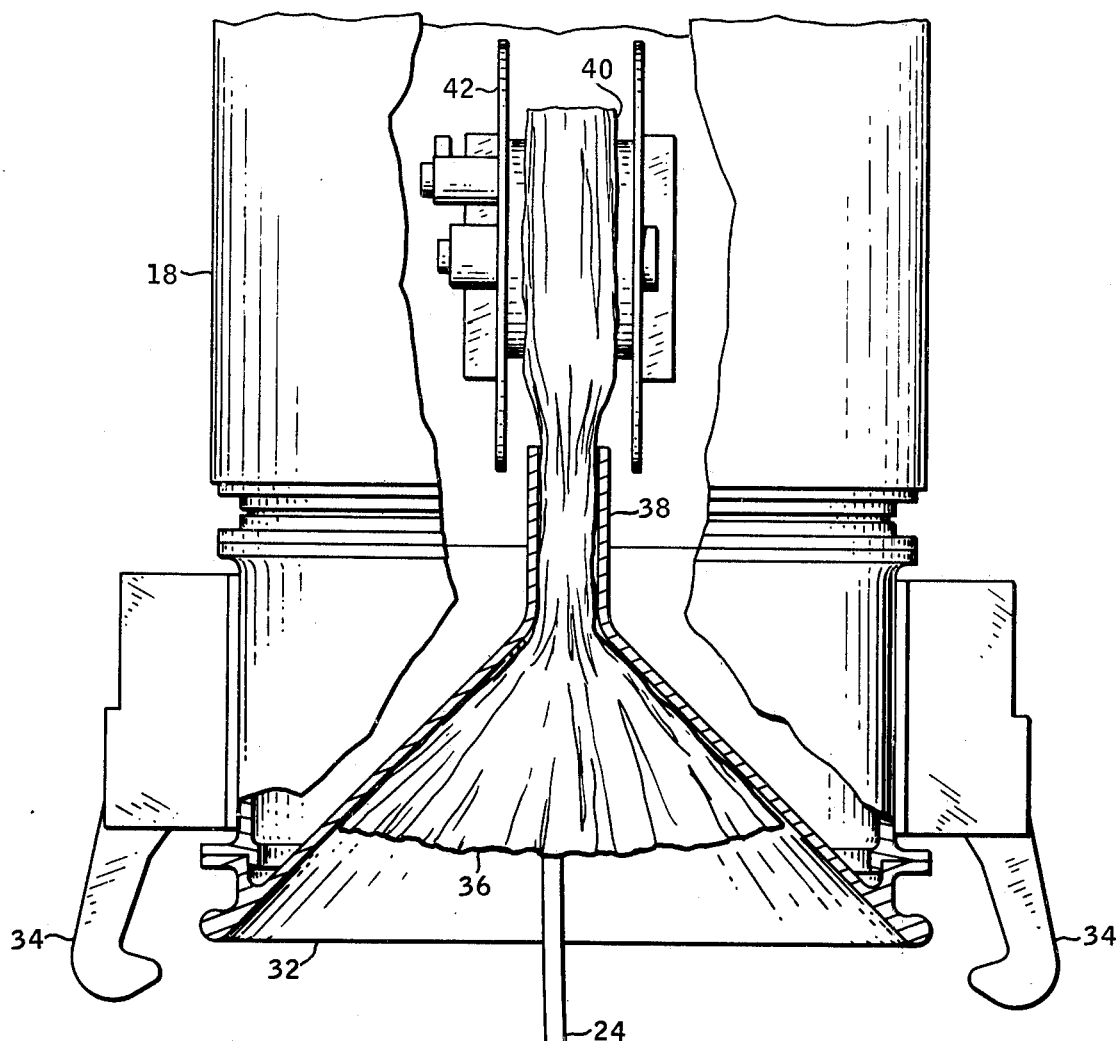
FIG. 4
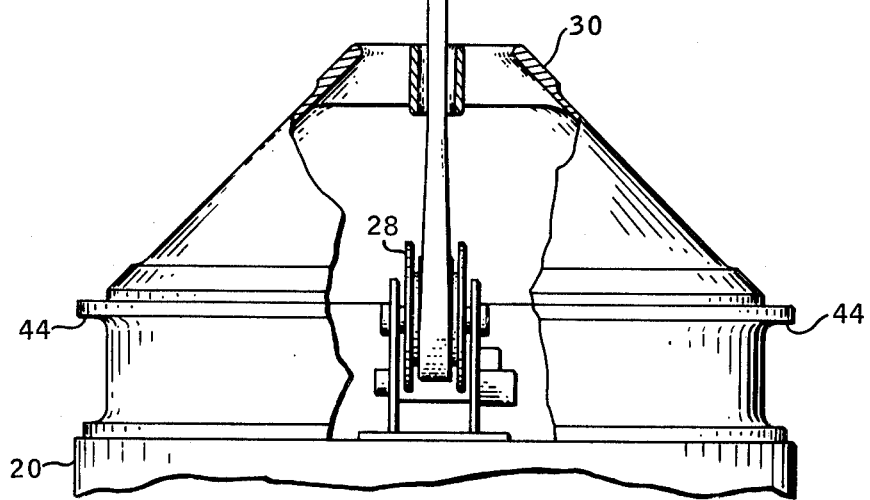

SPACE PLATFORM DOCKING DEVICE

BACKGROUND OF THE INVENTION

This invention relates in general to space vehicle docking systems and, more specifically, to systems for docking large structures in earth orbit with remote sensing and control.

A variety of devices to accomplish docking or joining of space vehicles have been designed and put into use. Typical docking devices include those used in the Gemini, Apollo and Soyuz programs. These devices have worked well for single vehicles under manual control. However, in cases where large structures in orbit are to be joined or docked, new problems must be overcome which result from large sizes and mass, inherent structural flexibility, slow response, and remote automatic control. For example, accepted techniques of "driving" the two mating halves of a docking fixture together are not feasible from the standpoint of control capability needed and the impact loads and disturbances which occur.

One known orbital vehicle docking system, as described in U.S. Pat. No. 3,201,065, uses a small rendezvous drone launched from one vehicle at the end of a line. An operator in the vehicle controls the drone to guide it to a docking fixture on the other vehicle. With the aid of magnetic attraction, the drone is aligned with, then connected to, the fixture. The cable may then be reeled in to bring the vehicles together. While this system is capable of slowly and smoothly bringing the vehicles together, it is not capable of remote or automatic control. It is complex and cumbersome, and capable of operation only so long as the drone gas propellant supply lasts.

SUMMARY OF THE INVENTION

The above problems, and others, are overcome by the space platform docking device and method of this invention which basically comprises means extending a flexible boom from one structure, a large open conical funnel on the other, means to guide the boom end to the apex of the funnel, means to retract the boom into one structure to bring the structures into contact, and means to rigidly latch the two structures together, upon final closure of the space between the structures.

BRIEF DESCRIPTION OF THE DRAWING

Details of the invention, and of a preferred embodiment thereof, will be further understood upon reference to the drawing, wherein:

FIG. 4 is a plan view, partially cut away, of the docking device showing retraction of the guide cone;

DETAILED DESCRIPTION OF THE INVENTION

Figure 1:
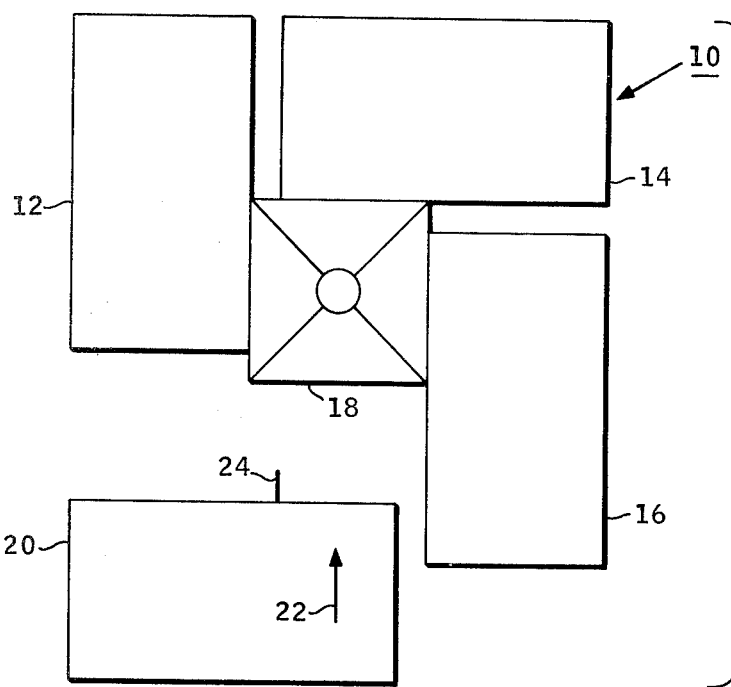
FIG. 1 is a plan view of a large space structure using the docking device of this invention.
Figure 7:
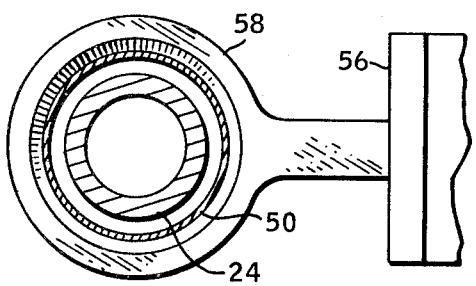
FIG. 7 is a partial sectional view through the boom capture means, taken on line 7—7 in FIG. 6.
Figure 8:
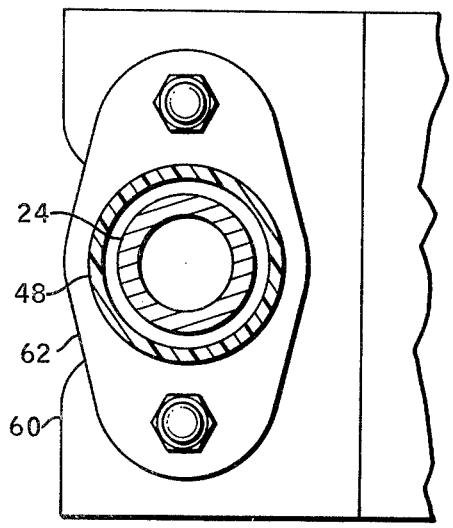
FIG. 8 is a partial sectional view through the boom capture means, taken on line 8—8 in FIG. 6.

Referring now to FIG. 1, there is seen a typical space station 10 comprising three structures 12, 14 and 16 joined to central control module 18. A fourth structure 20 is to be docked or joined to control module 18. As structure 20 is moved toward station 20 as indicated by arrow 22 by remote or automatic control, a boom 24 is deployed for engagement in a securing assembly on cone 18.

The docking device is illustrated in the several positions necessary for approach, connection, contact and latching in FIGS. 2-5.

Figure 2:
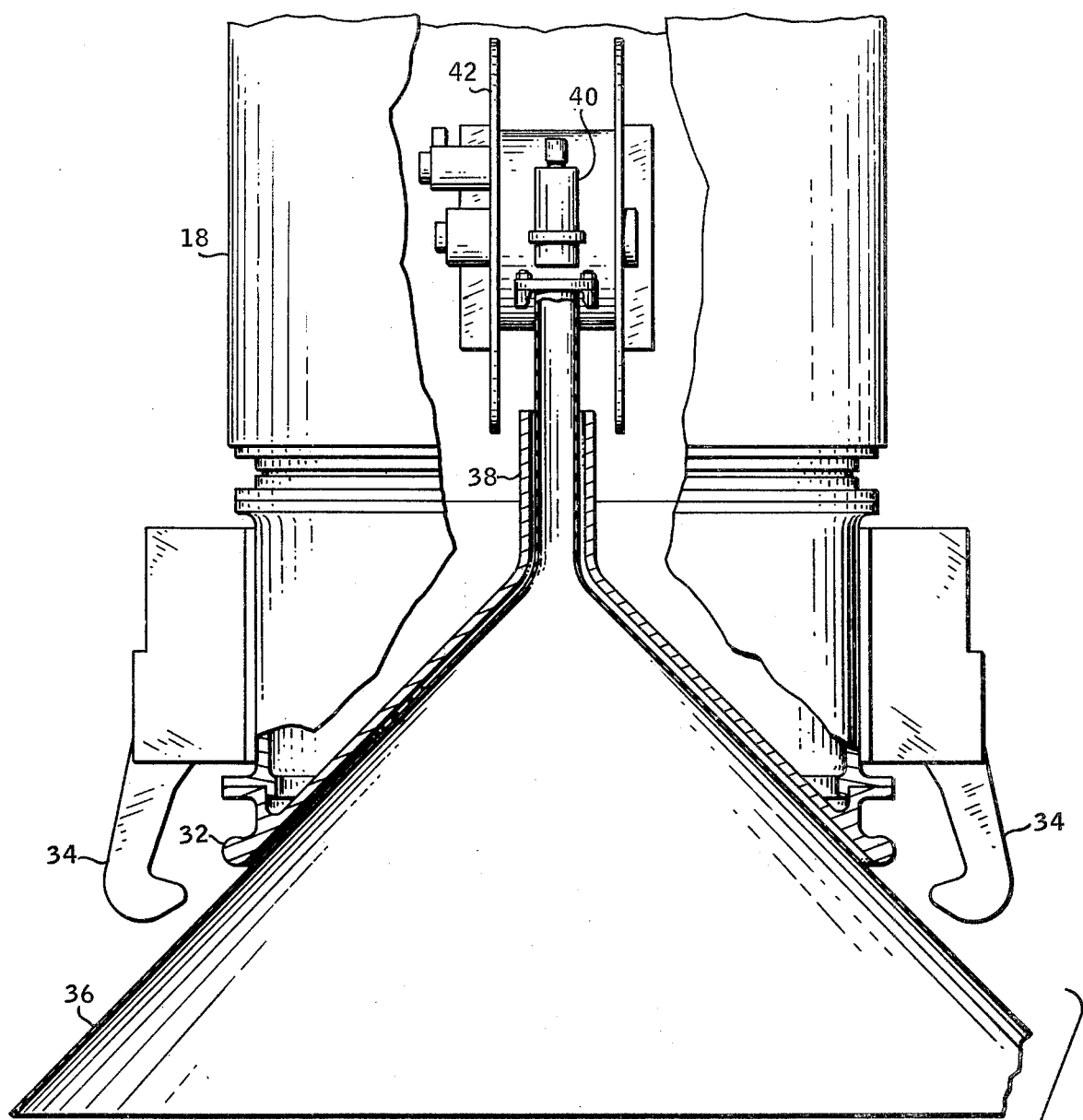
FIG. 2 is a plan view, partially cut away, of the docking device during the structure approach phase.
Figure 2:
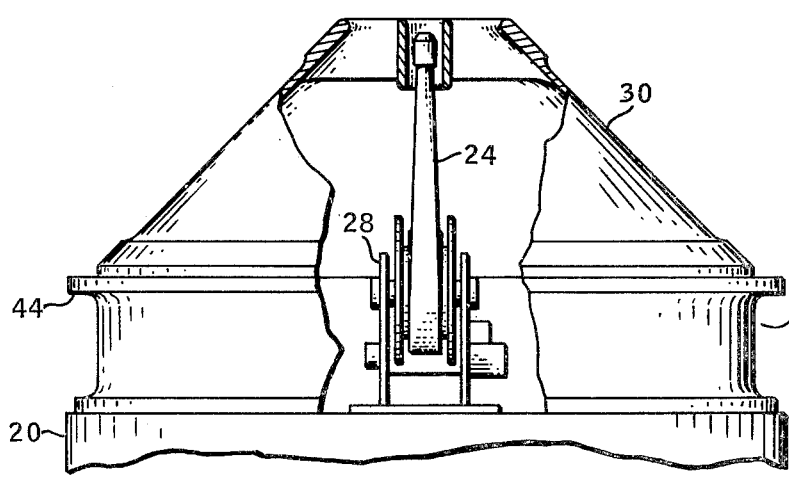

FIG. 2 illustrates the docking device during early stages of the approach of the two structures toward each other. The position of the docking device on structure 20 includes a flattened boom 24 coiled on a reel 28 within a generally conical probe 30. Reel 28 is adapted to be operated by remote or automatic (e.g. acutated by a conventional sensor sensing the proximity of structure 18) control (not shown) to extend boom 24.

Boom 24 may be formed from any material which can be reeled in a flattened state, but upon release forms a substantially locally rigid but overall flexible tubular boom. Typically a circular cross section resilient wire mesh tube may be slit lengthwise and flattened for reeling. When unreeled, the tube will regain its tubular form. Similarly, a resilient metal or plastic tube having a cross-section corresponding to the area of overlap of two circles can be flattened for reeling and will regain the still but flexible tube shape upon unreeling.

Structure 18, also as seen in FIG. 2, includes a receiving cone 32 corresponding in shape to probe 30. A series of latch members 34 are arranged around the edges of cone 32. A guide cone or funnel 36 is positioned on the inner surface of cone 32. Funnel 36 has a much greater surface adapted to guide a member contacting the surface toward the center of the funnel. Funnel 36 is constructed of a flexible, collapsible material. Typically, funnel 36 may be made from a shape-retaining plastic which can be collapsed, or may be an inflatable structure, typically having a series of radial inflatable tubes extending along the conical surface. When inflated, a substantially rigid conical surface is provided, while upon deflation the surface becomes soft and pliable. At the center of funnel 36 there is provided a tailpiece 38 which attaches to core 46 of reel 42 described in detail below.

As the two structures approach each other, reel 28 is operated to deploy boom 24. The end of boom 24 initially contacts funnel 36 somewhere on its surface. Funnel 36 has a sufficiently rigid and slippery surface, and boom 24 is sufficiently flexible, to permit the end of boom 24 to slide across the funnel surface, enter tailpiece 38 and finally engage boom capture means 40. The open end of funnel 36 is sufficiently large to assure contact with the end of boom 24 despite significant initial misalignment between structures 18 and 20. Since boom 24 is relatively long, only slight flexibility is required to permit sufficient deflection of the boom to move along the surface of funnel 36.

Once the end of boom 24 is captured by capture means 40 (as described in detail in conjunction with the description of FIGS. 6-9, below), funnel 36 is preferably retracted as illustrated in FIG. 4.

Where funnel 36 is a thin stiff plastic with surfacing ribs as seen in FIG. 4, it is merely mechanically deformed as it passes through the tubular section of cone 32 and is wrapped around reel 42. Funnel 36 may be of double wall inflated construction, or may have inflated ribs, which would be deflated prior to retraction.

Once funnel 36 is retracted to reel 42, reel 42 and/or reel 28 may be operated to retract boom 24 and bring probe 30 into contact with cone 32. Once this is done, as shown in FIG. 5, latches 34 may be actuated remotely or by any suitable sensor, to move from the position shown in FIG. 4 to that shown in FIG. 5, where latches 34 engage flange 44 on probe 30 to securely and rigidly fasten structures 18 and 20 together.

Figure 3:
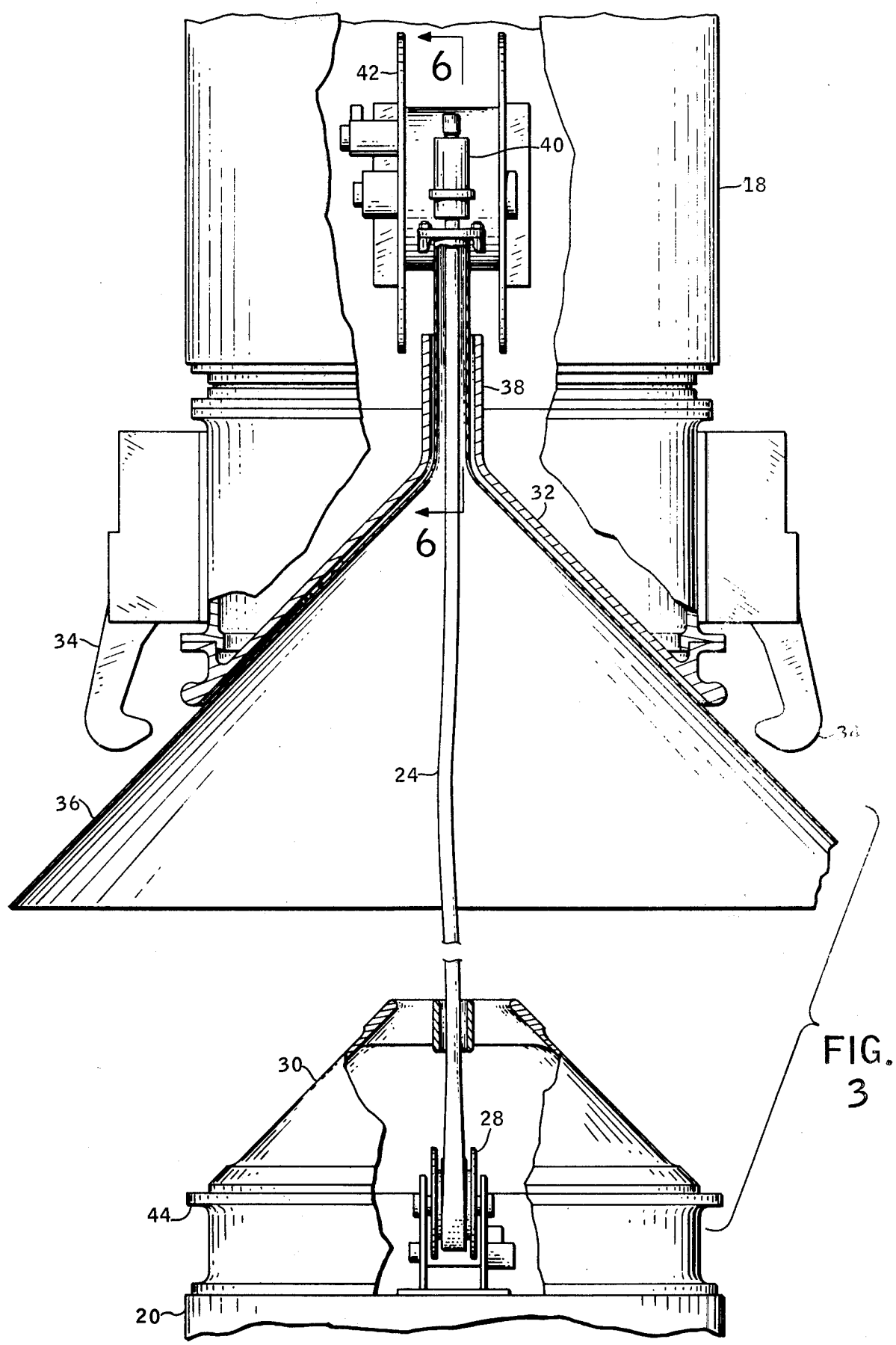
FIG. 3 is a plan view, partially cut away, of the docking device illustrating boom capture.
Figure 5:
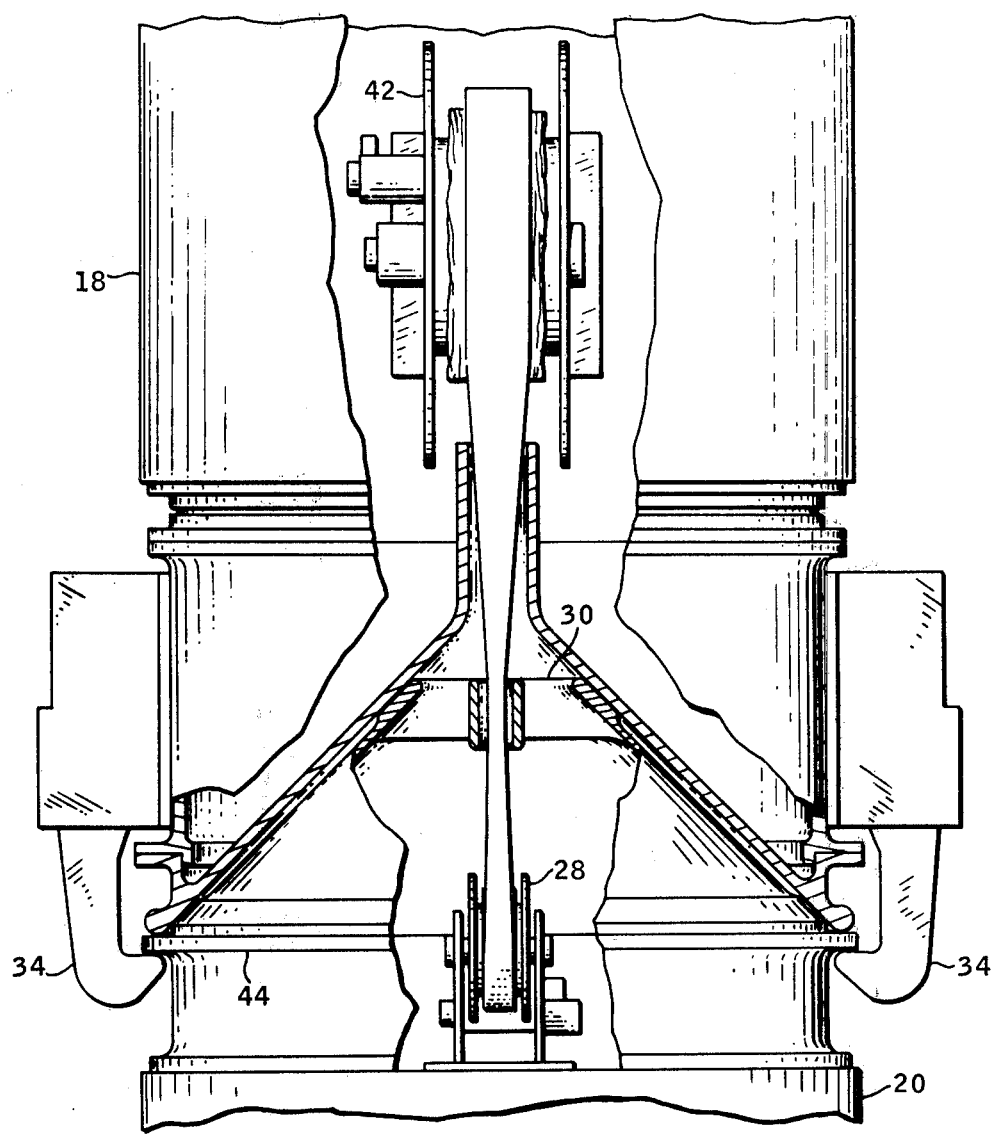
FIG. 5 is a plan view, partially cut away, of the docking device with the latching system actuated.

It is preferred to retract funnel 36 as indicated in FIG. 4, so that good surface-to-surface contact between probe 30 and cone 32 can be attained as shown in FIG. 5. Alternatively, once the end of boom 24 is captured by capture means 40 as indicated in FIG. 3, reel 28 may be operated to retract boom 24. Structures 18 and 20 will then be brought together with funnel 36 sandwiched between probe 30 and cone 32. Latches 34 may be actuated so as to penetrate through or deform portions of funnel 36 as they move into engagement with flange 44.

Figure 6:
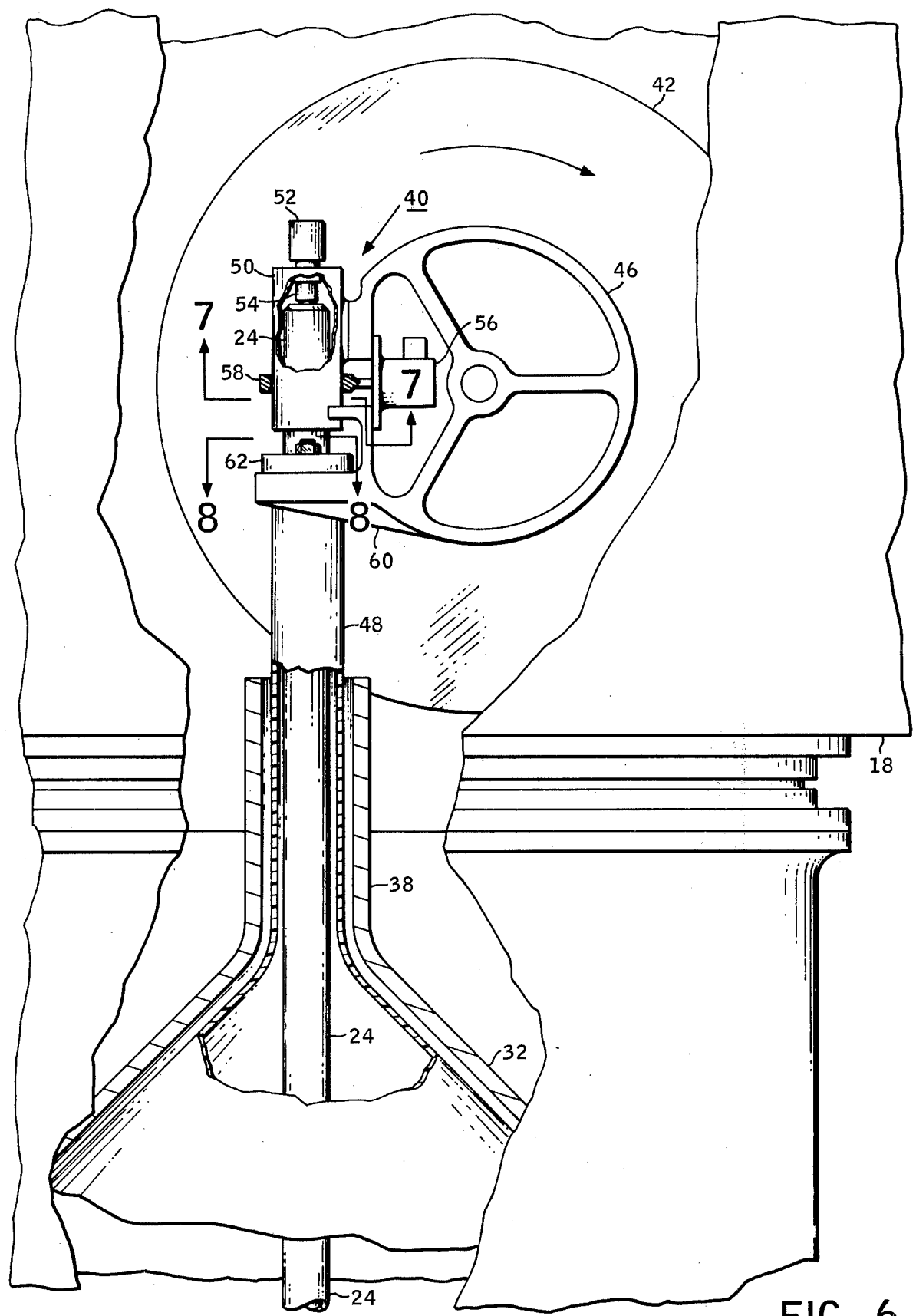
FIG. 6 is a partial sectional view of the docking device taken on line 6—6 in FIG. 2.

Details of the boom capture means 40 are provided in FIGS. 6-9. FIG. 6 is a section view through reel 42 taken on line 6—6 in FIG. 3 with portions of the capture means 40 cut away. Capture means 40 is fastened to the core 46 of reel 42 for rotation therewith. The conventional mounting and drive means for reel 42 are omitted for clarity. Capture means 40 is shown in FIG. 6 an instant before capture.

Figure 9:
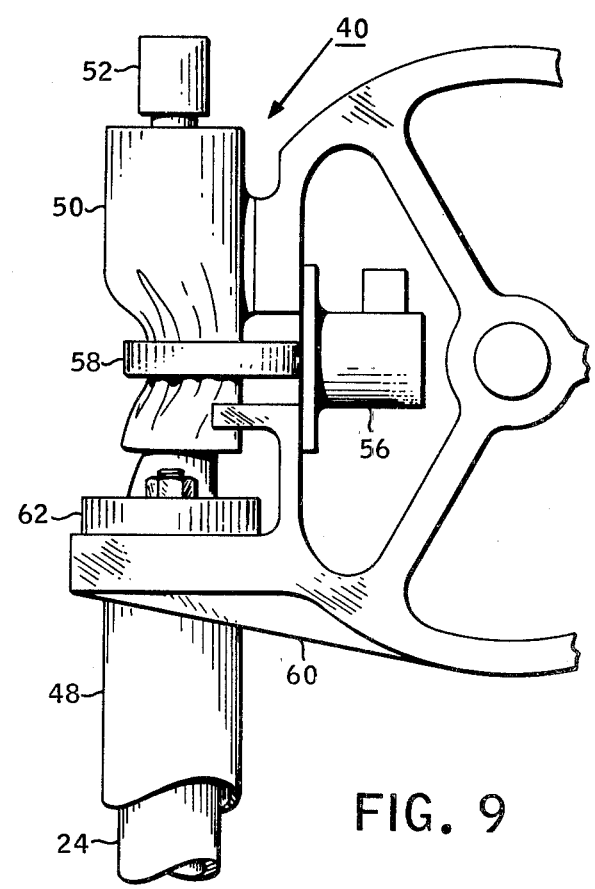
FIG. 9 is a detail view of the boom capture means of FIG. 6, illustrating completion of capture.

As structure 18 and 20 approach each other, the end of boom 24 moves across the surface of funnel 36, enters the tailpiece 38 of funnel 36 into tube 48 and then moves into trigger housing 50. At the end of trigger housing 50 is a trigger switch 52 with a depressible switch plunger 54. When plunger 54 is pressed by the end of boom 24, a conventional pyrotechnic puller device 56 is actuated. A noose 58 (shown in plan view in FIG. 7) surrounding trigger housing 54 is rapidly moved to the right as seen in FIG. 6 to deform trigger housing 54 and boom 24 as shown in FIG. 9, to positively capture the boom.

Bracket 60 which supports puller 56 and trigger housing 50, also supports a mounting flange 62 which holds the end of tube 48. Once the end of boom 24 is positively captured as shown in FIG. 9, reel 42 is rotated to retract tube 48 and the balance of funnel 36 as boom capture means 40 rotates with reel 42.

In the illustrated preferred embodiment, the end of boom 24 is irreversibly captured. This is strongly preferred where a permanent space structure is being assembled because of the very positive capture provided. If undocking capability is desired, a conventional quick-acting reversible motor could be substituted for pyrotechnic puller 56 and trigger housing 50 and the portion of boom 24 near the end could be formed from a resilient material which would return to the original shapes upon release of puller 56. In this reversible case, either funnel 36 would be made from a resilient or inflatable material which would resume the original shape upon reverse operation of reel 42, or the funnel would not be retracted and the latches 34 could operate through resilient funnel areas, as described above.

Other variations, applications and ramifications of the invention and preferred embodiment thereof described above will occur to those skilled in the art upon reading the present disclosure. These are intended to be included within the scope of this invention, as defined in the appended claims.

We claim:

1. The space platform docking device which comprises:
    a first structure and a second structure which are to be brought into a rigidly docked relationship;
    an extendable flexible boom adapted to be extended from said first structure toward said second structure;
    a hollow generally conical funnel means on said second structure with the open larger end of said funnel means extending toward said boom;
    boom capture means located adjacent to the smaller internal end of said funnel means;
    said capture means comprising a closed ended tubular member adapted to receive the end of said boom, a pressure actuated switch at the inside of the closed end of said tubular member adapted to be actuated by the end of said boom, a ring surrounding said tubular member connected to a puller mechanism, said puller mechanism electrically connected to said switch whereby switch actuation causes said ring to be moved by said puller mechanism to crush said tubular member and boom and mechanically lock them together; and
    means to retract said boom on one of said first and second structures;
    latch means on each of said first and second structures adapted to move into latching engagement upon contact;
    whereby as said structures move toward each other the end of said boom moves across the inner surface of said funnel means to said boom capture means, said boom is retracted and said latch means is engaged.

2. The device according to claim 1 wherein said funnel means comprises a rigid funnel surface having a larger flexible funnel member in surface contact therewith and extending beyond the rigid funnel surface.

3. The device according to claim 2 wherein said flexible funnel member includes a tubular tailpiece connected to said funnel member at the apex thereof, said tailpiece extending through an opening in said rigid funnel surface, the opposite end of said tailpiece being connected to a reel whereby rotation of said reel will cause said flexible funnel member to be collapsed, drawn through said opening and wrapped around said reel.

4. The method of space platform docking which comprises the steps of:
    providing an extendable flexible boom and a first portion of a latching means on one structure;
    providing a boom capture means, a generally conical funnel leading to said boom capture means and the remaining second portion of said latching means on a second structure;
    moving said structures toward each other so that the end of said boom contacts the inner surface of said funnel means;
    continuing to move said structures toward each other so that said boom end moves over said funnel surface until the end engages said boom capture means;
    securing said boom end to said boom capture means by moving said boom end into operative engagement with a pressure actuated switch at the end of a tubular member and crushing said tubular member and boom in response to switch actuation to lock said tubular member to said boom;

holding said boom end in said capture means for a period sufficient to eliminate relative motion between said first and second structures;

retracting said boom into one of said first and second structures until said first and second portions of said latching means are brought into contact; and latching said two portions together to rigidly secure said first and second structures together.

5. The method according to claim 4 wherein said tubular member is mounted on a reel and said boom is retracted by rotating said reel to reel up said boom.

6. The method according to claim 5 wherein a flexible funnel member is located in contact with said conical funnel and has a tubular tailpiece connected to said reel through which said boom end moves toward said capture means, whereby said flexible funnel member is collapsed and reeled up with said boom when said reel is rotated.

7. The space platform docking device which comprises:

a first structure and a second structure which are to be brought into a rigidly docked relationship;

an extendable flexible boom adapted to be extended from said first structure toward said second structure;

a hollow generally conical rigid funnel means on said second structure with the open larger end of said rigid funnel means extending toward said boom;

a larger flexible funnel member in surface contact with the interior of said rigid funnel and extending therebeyond, said flexible funnel member including a tubular tailpiece connected to said funnel member at the apex thereof, said tailpiece extending through an opening in said rigid funnel surface, the opposite end of said tailpiece being connected to a reel whereby rotation of said reel will cause said flexible funnel member to be collapsed, drawn through said opening and wrapped around said reel;

boom capture means located adjacent to the smaller internal end of said funnel means;

means to retract said boom on one of said first and second structures;

latch means on each of said first and second structures adapted to move into latching engagement upon contact;

whereby as said structures move toward each other the end of said boom moves across the inner surface of said funnel means to said boom capture means, said boom is retracted and said latch means is engaged.

* * * * *